United States Patent
Wu et al.

(10) Patent No.: US 9,135,348 B2
(45) Date of Patent: Sep. 15, 2015

(54) METHOD AND APPARATUS FOR MACHINE-LEARNING BASED PROFILING

(75) Inventors: Wang Wu, Los Altos, CA (US);
Dorothy Tse, San Francisco, CA (US);
Michael Gassewitz, Ottawa (CA);
Denny Lung Sun Lee, Ottawa (CA);
Robert Gaudet, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 928 days.

(21) Appl. No.: 12/624,182

(22) Filed: Nov. 23, 2009

(65) Prior Publication Data
US 2010/0138370 A1 Jun. 3, 2010

Related U.S. Application Data

(60) Provisional application No. 61/116,667, filed on Nov. 21, 2008.

(51) Int. Cl.
*G06F 17/30* (2006.01)
*G06Q 30/02* (2012.01)
*H04H 60/31* (2008.01)
(Continued)

(52) U.S. Cl.
CPC .... *G06F 17/30867* (2013.01); *G06F 17/30702* (2013.01); *G06Q 30/02* (2013.01); *H04H 60/31* (2013.01); *H04H 60/33* (2013.01); *H04H 60/46* (2013.01)

(58) Field of Classification Search
CPC .................................. G06F 17/30; G06F 17/00
See application file for complete search history.

(56) References Cited

U.S. PATENT DOCUMENTS 4,975,840 A * 12/1990 DeTore et al. .................... 705/4
6,327,580 B1 * 12/2001 Pierce et al. .................. 705/401
(Continued)

FOREIGN PATENT DOCUMENTS

EP 2079046 A1 * 7/2009
EP 2169854 A1 3/2010

OTHER PUBLICATIONS

Nasraoui, Olfa, Maha Soliman, Esin Saka, Antonio Badia, and Richard Germain. "A web usage mining framework for mining evolving user profiles in dynamic web sites." Knowledge and Data Engineering, IEEE Transactions on 20, No. 2 (2008): 202-215.*
(Continued)

*Primary Examiner* — Farhan Syed
(74) *Attorney, Agent, or Firm* — Chiesa, Shahinian & Giantomasi PC

(57) ABSTRACT

A method and system for profiling a user based upon a user's previous on-line actions is provided. The profile provides a characterization of the user's preferences based upon a received user event. The user event identifying event identification information and a user identifier. A look-up in a cached web map is performed to retrieve classification information associated with the event identification information. A user profile is retrieved or created for the user identifier. Profile update information is generated based upon the retrieved classification information for the user event, to identify how the user is to be updated based upon the retrieved classification information and defined profiling rules. The user profile is updated and stored for access by an external advertising server. The classification information provides a text-score record comprising a text string and a score defined in relation to a lexical ontology comprising a hierarchy of categories.

16 Claims, 6 Drawing Sheets

(51) Int. Cl.
  *H04H 60/33* (2008.01)
  *H04H 60/46* (2008.01)

(56) References Cited

U.S. PATENT DOCUMENTS

| | | | |
|---|---|---|---|
| 6,336,099 B1 * | 1/2002 | Barnett et al. | 705/14.35 |
| 6,778,982 B1 * | 8/2004 | Knight et al. | 707/737 |
| 6,883,008 B2 * | 4/2005 | Crivella et al. | 1/1 |
| 6,898,598 B2 * | 5/2005 | Himmel et al. | 1/1 |
| 7,120,790 B1 * | 10/2006 | LoPresti | 713/151 |
| 7,162,451 B2 * | 1/2007 | Berger et al. | 705/51 |
| 7,181,438 B1 * | 2/2007 | Szabo | 1/1 |
| 7,213,032 B2 * | 5/2007 | Mascarenha | 707/792 |
| 7,281,054 B2 * | 10/2007 | Ishioka et al. | 709/231 |
| 7,373,336 B2 * | 5/2008 | Jasinschi et al. | 1/1 |
| 7,379,946 B2 * | 5/2008 | Carus et al. | 1/1 |
| 7,383,203 B1 * | 6/2008 | Feldstein et al. | 705/14.67 |
| 7,409,393 B2 * | 8/2008 | Gregoire et al. | 1/1 |
| 7,421,725 B2 * | 9/2008 | Hane et al. | 725/46 |
| 7,467,414 B2 * | 12/2008 | Schlesinger | 726/27 |
| 7,533,399 B2 * | 5/2009 | Ma et al. | 725/46 |
| 7,689,536 B1 * | 3/2010 | Weissman et al. | 707/999.002 |
| 7,756,509 B2 * | 7/2010 | Rajagopalan et al. | 455/411 |
| 7,793,213 B2 * | 9/2010 | Shmukler et al. | 715/234 |
| 7,797,305 B2 * | 9/2010 | Basson et al. | 707/713 |
| 7,801,896 B2 * | 9/2010 | Szabo | 707/739 |
| 7,870,279 B2 * | 1/2011 | Chuang et al. | 709/231 |
| 7,962,471 B2 * | 6/2011 | Adar et al. | 707/709 |
| 7,979,468 B2 * | 7/2011 | DeWoolfson | 707/790 |
| 8,005,833 B2 * | 8/2011 | Adar et al. | 707/734 |
| 8,032,395 B2 * | 10/2011 | Helmus et al. | 705/2 |
| 8,185,553 B2 * | 5/2012 | Carus et al. | 707/791 |
| 8,219,585 B2 * | 7/2012 | DeWoolfson | 707/790 |
| 8,224,855 B2 * | 7/2012 | DeWoolfson | 707/790 |
| 8,510,340 B2 * | 8/2013 | Carus et al. | 707/791 |
| 8,515,997 B2 * | 8/2013 | DeWoolfson | 707/790 |
| 8,782,088 B2 * | 7/2014 | Carus et al. | 707/791 |
| 2002/0059395 A1 * | 5/2002 | Liou | 709/217 |
| 2003/0149975 A1 | 8/2003 | Eldering et al. | |
| 2005/0228815 A1 * | 10/2005 | Carus et al. | 707/102 |
| 2005/0234753 A1 * | 10/2005 | Pinto et al. | 705/7 |
| 2007/0073682 A1 * | 3/2007 | Adar et al. | 707/5 |
| 2008/0091634 A1 * | 4/2008 | Seeman | 706/59 |
| 2008/0255884 A1 * | 10/2008 | Carus et al. | 705/3 |
| 2009/0171760 A1 * | 7/2009 | Aarnio et al. | 705/10 |
| 2009/0254540 A1 * | 10/2009 | Musgrove et al. | 707/5 |
| 2009/0313278 A1 * | 12/2009 | Dewoolfson | 707/102 |
| 2010/0293057 A1 * | 11/2010 | Haveliwala et al. | 705/14.66 |
| 2011/0295900 A1 * | 12/2011 | DeWoolfson | 707/792 |
| 2011/0295911 A1 * | 12/2011 | DeWoolfson | 707/803 |
| 2012/0209626 A1 * | 8/2012 | Carus et al. | 705/3 |
| 2012/0232923 A1 * | 9/2012 | Carus et al. | 705/2 |
| 2012/0317118 A1 * | 12/2012 | DeWoolfson | 707/737 |
| 2014/0288973 A1 * | 9/2014 | Carus et al. | 705/3 |

OTHER PUBLICATIONS

Gauch, Susan, Mirco Speretta, and Alexander Pretschner. "Ontology-based user profiles for personalized search." in Ontologies, pp. 665-694. Springer US, 2007.*

Challam, Vishnu Kanth Reddy. "Contextual information retrieval using ontology based user profiles." PhD diss., university of Kansas, 2004.*

Zhu, Xiaolan, Susan Gauch, Lutz Gerhard, Nicholas Kral, and Alexander Pretschner. "Ontology-based web site mapping for information exploration." In CIKM, vol. 99, pp. 188-194. 1999.*

Preliminary Research Report and Written Opinion issued in related French Patent Application No. 1002120, dated Dec. 27, 2010, and English translation thereof, 18 pages.

* cited by examiner

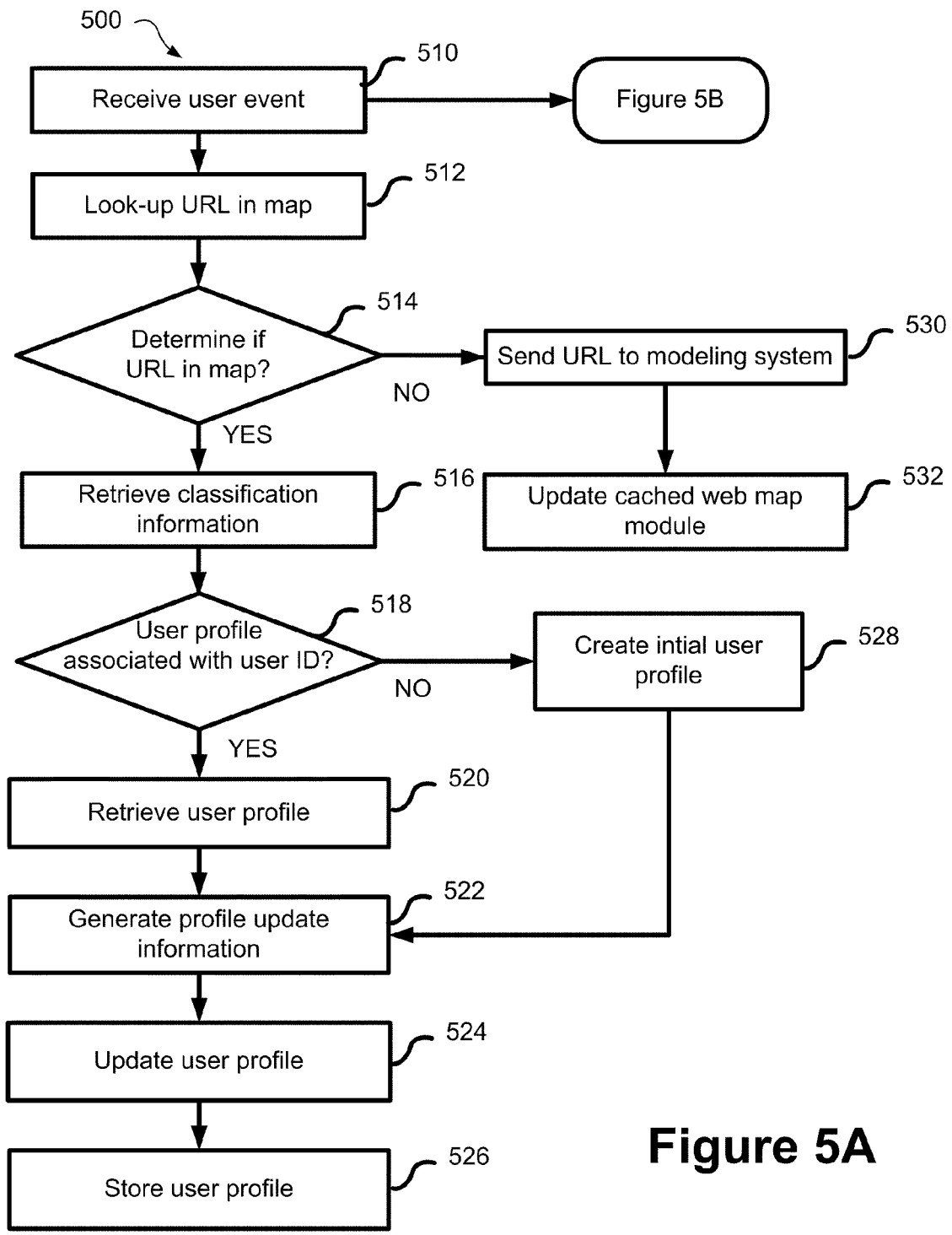

METHOD AND APPARATUS FOR MACHINE-LEARNING BASED PROFILING

CROSS-REFERENCE TO RELATED APPLICATIONS

This application claims priority, under 35 U.S.C. § 119(e), to U.S. Provisional Patent Application Ser. No. 61/116,667, filed on Nov. 22, 2008. U.S. Provisional Patent Application Ser. No. 61/116,667 is hereby incorporated by reference in its entirety.

TECHNICAL FIELD

The present disclosure relates to the field of behavioral targeting of on-line user behaviour. In particular, to a method and a system for machine-learning based user profiling.

BACKGROUND

Behavioral targeting is a technique that is used to increase the effectiveness of advertisements, or goods and services offerings, to be presented to a potential consumer (a.k.a. a user) based on historic behaviors (e.g. actions, activities) by the user. Analysis of the user's previous actions in on-line interactions (e.g. web pages viewed, multimedia items selected, and products purchased) using rules or algorithms can result in a characterization of the user's preferences that can be embodied in a user profile.

Typically the rules or algorithms used to generate a user profile (i.e. profiling) are adapted to the specific domain (e.g. searching or viewing Internet web pages) in which the user is participating. The rules or algorithms are typically derived from the analysis of the behaviors of a set of users having activities in the specific domain. In the previous art, the rules or algorithms used in the analysis have been the result of either human development or machine-learning Human developed rules or algorithms are labor intensive and can be error prone. Machine-learned rules derived by data mining of user historic data can be computing intensive, time consuming and as such is done as an off-line (i.e. not real-time) activity.

Accordingly, method and system that enable improved machine-learning based profiling of user on-line actions remains highly desirable.

SUMMARY

In accordance with an aspect of the present disclosure there is provided a method of profiling a user of a computing device, connected to a network, based upon a user's on-line actions. The method comprising: receiving a user event generated by actions performed by the user on the computing device, the user event identifying event identification information indicating content requested by the user and a user identifier; performing a look-up in a cached web map using the event identification information to determine classification information associated with the content requested by the user, the classification information providing a text-score record comprising at least a text string and a score associated with the text string, the text string defined in relation to a lexical ontology comprising a hierarchy of categories, and the score representing a strength of association of the text string to the content; retrieving classification information associated with the event identification information from the cached web map if classification information is present for the event identification information; retrieving a user profile associated with the user identification information from a profile database; generating profile update information by applying profiling rules defining known associations between user action events and user behaviours to the retrieved classification information for the user event, wherein the profile update information identifies how to modify the user profile by adding classification identification information or modifying existing classification identification information scores stored in the profile; updating the user profile based upon the update information, the user profile providing a characterization of the user's preferences; and storing the updated user profile wherein the user profile can be accessed by an external advertising server.

In accordance with another aspect of the present disclosure there is provided a system for profiling a user of a computing device, connected to a network based upon a user's on-line actions. The system comprising: an event receiver module for receiving a user event generated by the actions performed by the user on the computing device, the user event identifying event identification information indicating content requested by the user and a user identifier; a web map module for storing classification information associated a plurality of event identification information instances, the classification information providing a text-score record comprising at least a text string and a score associated with the text string, the text string defined in relation to a lexical ontology comprising a hierarchy of categories and fine grain text, and the score representing a strength of association of the text string to the content; an event processor module for processing the received user event to determine classification information from the web map based upon the event identification information; a profile database comprising a plurality of user profiles, each profile identifying classification information associated with a unique user identifier and providing a characterization of the user's preferences; and a profiling engine module for retrieving a user profile form the profile database based upon the received user identifier and for generating update information by applying profiling rules defining known associations between user action events and user behaviours to the retrieved classification information to update the retrieved user profile, wherein the profile update information identifies how to modify the user profile by either adding classification identification information or modifying existing classification identification information score stored in the profile.

In accordance with another aspect of the present disclosure there is provided a computer-readable storage medium containing instructions for execution on a processor for performing a method of profiling a user of a computing device, connected to a network, based upon a user's on-line actions. The instructions comprising: receiving a user event generated by actions performed by the user on the computing device, the user event identifying event identification information indicating content requested by the user and a user identifier; performing a look-up in a cached web map using the event identification information to determine classification information associated with the content requested by the user, the classification information providing a text-score record comprising at least a text string and a score associated with the text string, the text string defined in relation to a lexical ontology comprising a hierarchy of categories, and the score representing a strength of association of the text string to the content; retrieving classification information associated with the event identification information from the cached web map if classification information is present for the event identification information; retrieving a user profile associated with the user identification information from a profile database; generating profile update information by applying profiling rules defining known associations between user action events and user behaviours to the retrieved classification information for the user event, wherein the profile update information identifies how to modify the user profile by adding classification identification information or modifying existing classification identification information scores stored in the profile; updating the user profile based upon the update information, the user profile providing a characterization of the user's preferences; and storing the updated user profile wherein the user profile can be accessed by an external advertising server.

BRIEF DESCRIPTION OF THE DRAWINGS

Further features and advantages of the present disclosure will become apparent from the following detailed description, taken in combination with the appended drawings, in which:

FIG. 5A & 5B show a flow diagram representing a method for machine-learning based profiling.

It will be noted that throughout the appended drawings, like features are identified by like reference numerals.

DETAILED DESCRIPTION

Embodiments are described below, by way of example only, with reference to FIGS. 1-5.

Behavioral targeting is a technique that is used to increase the effectiveness of advertisements, or goods and services offerings, to be presented to a potential consumer (a.k.a. a user) based on historic behaviors (e.g. actions, activities) by the user. Analysis of the user's previous actions during interaction with interactive computer devices such as web pages viewed, multimedia items selected or viewed, and products purchased, are analyzed using rules or algorithms that result in a characterization of the user's preferences that can be embodied in a user profile. The interactions of a user in an on-line interactive environment with web pages or multimedia content through a web browser, interactive viewing devices such as computers, set-top boxes, interactive television applications such as internet protocol television (IPTV), media computing devices, smart phones, or mobile computing platforms can be tracked.

A method and system for machine-learning based profiling generates a user profile by receiving user events (e.g. web page views), obtaining classification information associated with an object of the event (e.g. the web page), and applying modeling rules obtained from a modeling system. The user profile can be provided to an external system such as, for example, an advertising server that uses the user profile in the targeting (i.e. selecting based on the user's profile) of content (e.g. advertisements) to be presented to the user. The user events can be provided to the modeling system where they are used in the generation of the modeling rules.

Figure 1:
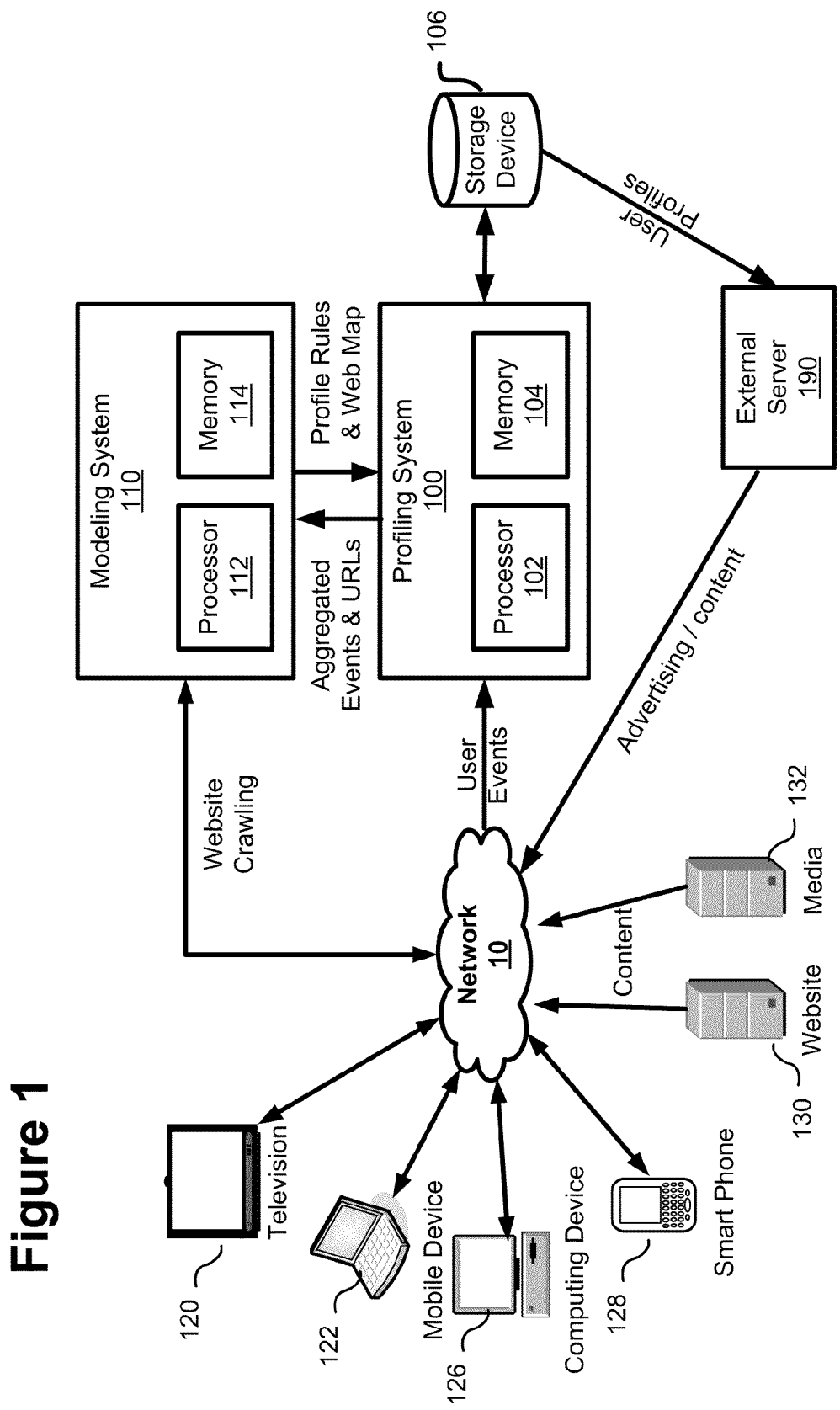
FIG. 1 is a schematic representation of a system for machine-learning based profiling.

FIG. 1 is schematic representation of a system for machine-based profiling. Users interact with web content or media through a network 10, such as the internet using various devices. Devices such as but not limited to televisions 120 that are internet enabled or through set top boxes, mobile devices 122 such as laptops or netbooks, computing devices 126 such as desktop computers and smart phones 128 enable users to browse websites or select media content for viewing. The network 10 may include an internet service provider (ISP) network which provides an interface for the user either directly to website servers 130 and media servers 132 or to a larger network such as the internet which provides access to the content. User events between the user devices and the website 130 or media servers 132 are copied to profiling system 100. The user events may be copied and forwarded within the ISP network or by an intermediary or end destination website servers. The events may comprise packets of information, such as a hyper text transfer protocol (HTTP) GET request that indicates the content the user is interested in viewing. The profiling system 100 may be executed on a server connected to the network 10, the profiling system 100 comprises at least a processor 102 and memory 104 for executing instructions for performing the method of profiling users. The profiling system 100 can also be connected to a storage device 106 for storing instructions for executing the method and/or for storing profiling data generated by the profiling system 100. The profile data stored on storage device 106 can be accessed by external servers 190 to enable determination of appropriate content or advertising for a particular user associated with the profile data. The profiling system 100 can also aggregate user events and provide the aggregated user events to a modelling system 110 to enable generation of profile rules based upon modelling of the user events. In addition, the modelling system 110 can provide web map information based on crawling websites or content to determine associated classification information. The web map can be used by the profiling system 100 to map a web page or multimedia content to one or classification categories for use in generating or updating a user's profile. The modelling system 110 also includes a processor 112 and memory 114 for executing instructions for performing modelling functions. Alternatively the modelling system 110 may be integrated with the profiling system 100 or provided by an external service provider.

Figure 2:
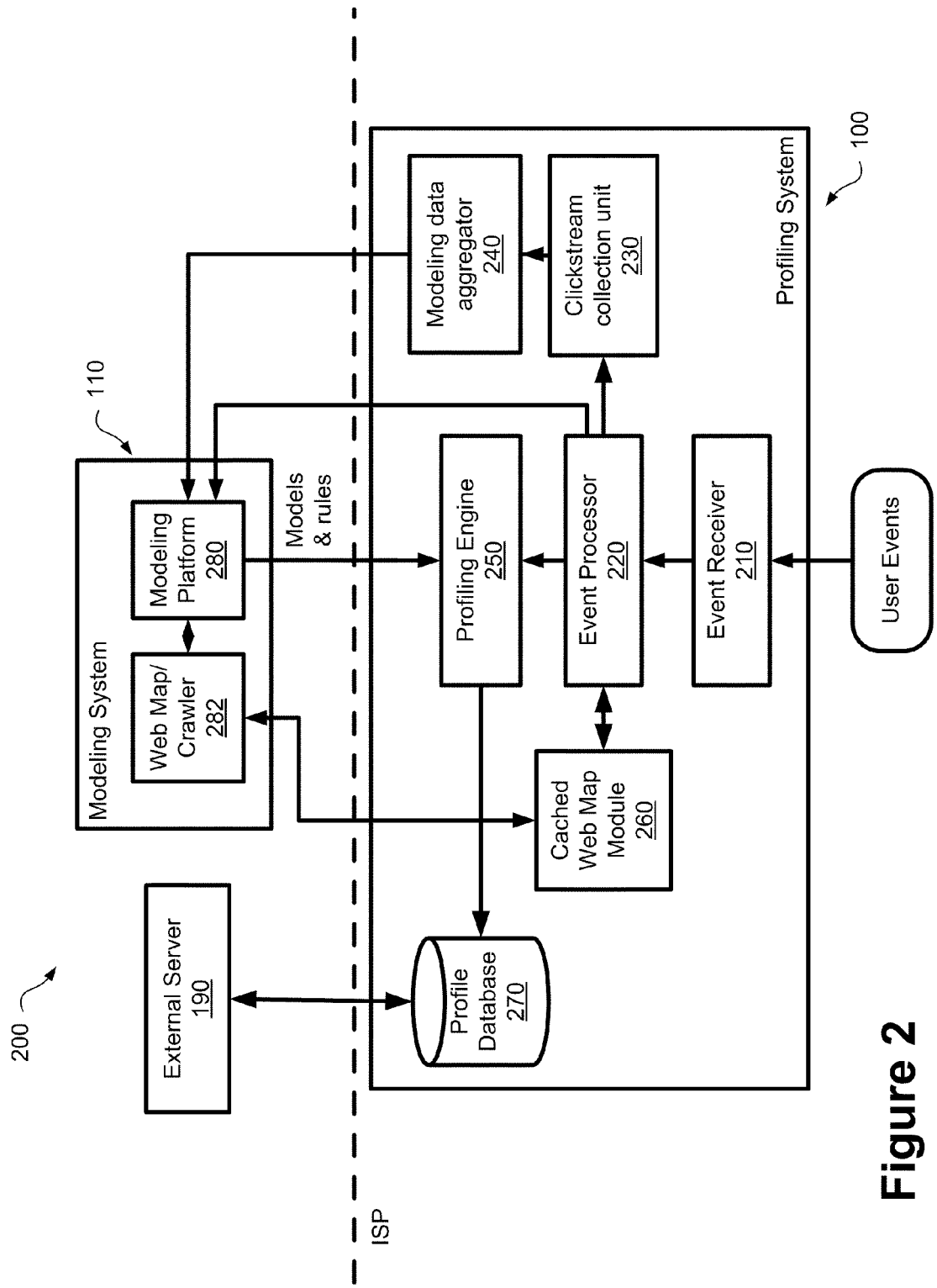
FIG. 2 is a schematic representation of a system for machine-learning based profiling.

FIG. 2 is a schematic representation of an exemplary embodiment of a system for machine-learning based profiling shown in a typical operating environment. The system 200 comprises a modelling system 110 and a profiling system 100. The system 200 may also optionally included an external server 190 for accessing user profile information generated by the profiling system 100. The profiling system 100 comprises an event receiver 210, an event processor 220, a clickstream collection unit 230, a modeling data aggregator 240, a profiling engine 250, a cached web map module 260, and a profile database 270. The profiling system 100 can, for example, be installed in the infrastructure of an Internet service provider (ISP). The profiling system 100 can be connected to (i.e. be in data communications with) a modeling system 110 that can be provided by, for example, a modeling provider. In the illustrated scenario, the profiling system 100 can generate a user profile for a user (i.e. a subscriber) of the ISP. The profiling system 100 generates the user profile by receiving user events (e.g. web page views, multimedia content access) and applying modeling rules obtained from the modeling system 110 to the user events to generate classification information used for adjusting the user profile. The user profile can be provided to the external system 190 such as, for example, an advertising server that uses the user profile in the targeting (i.e. selecting based on the user's preferences) of content (e.g. advertisements) to be presented to the user. In an alternative embodiment, the user profile can be provided to more than one external system 190 including, for example, an Internet Protocol television (IPTV) advertisement server, a mobile advertisement server and other targeted content deliver platforms.

The event receiver 210 receives events from the ISP infrastructure. Each event represents an action or activity initiated by the user. For the purposes of this description the event is a web page view. In an alternative embodiment the event can, for example, be a multimedia item selection or a product purchase. Each event includes identifying information specific to the user and to the event. For example, an event representing a web page view includes a Universal Resource Locator (URL) which identifies the viewed web page. The event receiver 210 forwards events to the event processor 220. The event receiver 210 can remove personally identifying information (PII) from the events while still allowing the event to be associated with a specific user before forwarding the event to the event processor 220. This may include, for example, substituting an anonymous identifier for an Internet Protocol (IP) number of the user. Further the event receiver 210 can filter events associated with sensitive web pages or content and not forward them to the event processor 220. This filtering may be done using a list of sensitive web pages.

The event processor 220 receives events from the event receiver 210. The event processor 220 uses the event identifying information (e.g. the web page URL) included in the event to look-up the web page associated with the event in the cached web map module 260. When the viewed web page (i.e. the URL) is found in the cached web map module 260, classification information corresponding to the viewed web page is sent from the cached web map module 260 to the event processor 220. The classification information together with user identity information associated with the event are sent by the event processor 220 to the profiling engine 250 to generate or update a profile associated with a particular user ID. When the viewed web page (i.e. the URL) is not found in the cached web map module 260, the URL is sent to the modelling platform processor 280 of modeling system 110 that can include a web map/crawler module 280 for mapping target website (or content) and generating associated classification information for the website. The web map/crawler module 282 may then send the generated classification information for the website to the cached web map module 260. Each received event is sent by the event processor 220 to the click-stream collection unit 230.

In an alternative embodiment where the event involves an action other than a web page view (e.g. viewing a television program or consuming a media presentation), reference herein to the cached web map module 260 can be replaced with reference to an event categorization and attribution lookup module which provides corresponding functionality for non-web-page view events.

Figure 3:
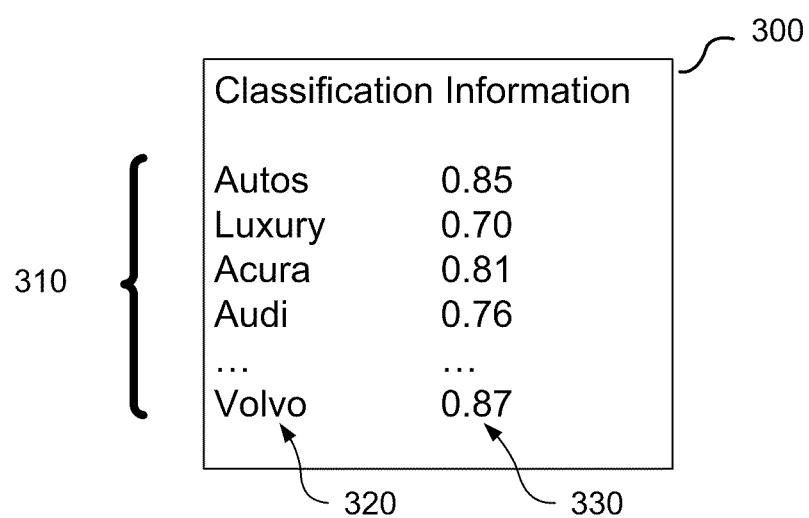
FIG. 3 is a schematic representation of a classification information instance.

FIG. 3 is a schematic representation of a classification information instance 300 provided in the web map 260. An instance of the classification information 300 is associated with each web page, or multimedia content, in the web map. The classification information 300 associated with a web page, URL or particular piece of content comprises a plurality of text-score records 310. Each text-score record 310 includes a text string 320 and a score 330. Each text string 320 represents an entry in a lexical ontology comprising a hierarchy of categories and fine-grain text. The classification information 300 associated with a web page contains a record 310 for each fine-grain text entry in the ontology that is also found in the web page. The score 330 associated with the text string 320 in each record 310 represents the strength of the association of the text string 320 with the web page. The score 330 can, for example, be a value (e.g. 0.65) within a scalar range (e.g. 0-1) representing the strength of the association of the text string 320 with the web page. If content such as multimedia files are used to determine the classification information instance, metadata associated with the content may be utilized to determine the appropriate text-score record.

Referring again to FIG. 3, the profiling engine 250 uses the classification information 300 associated with the event identifier of a user event to create or to update a user profile associated with the user identity information. The user profile, if one already exists, is stored in the profile database 270. The profiling engine 250 can retrieve the existing user profile from the profile database 270. The profiling engine 250 applies rules provided by a modeling platform 280 in creating or updating the user profile. The rules are generated by the modelling system using modelling or machine learning techniques such as logistic regression using anonymized user click stream data in order to identify and quantify, as rules, any patterns that may be used to predict a user's behaviour and so assign them to a category, or assign a value to a category. When an event is received indicating that a user has viewed a web page, the profiling engine 250 can, for example, increase by 0.1 the score corresponding to a category associated with the web page (i.e. the URL). Further, the profiling engine 250 can, for example, decrease by 0.1 the value of each of the scores corresponding to one or more categories in each user profile on a periodic basis (e.g. once a day) in order to provide a time decay function.

Figure 4A:
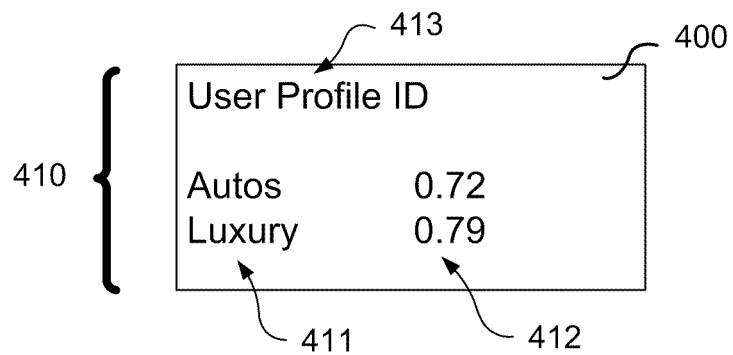
FIG. 4A is a schematic representation of a user profile.

FIG. 4A is a schematic representation of an illustrative user profile 400. The user profile 400, identifies an individual user by an identifier 413 and comprises a plurality of category-score records 410 associated with the user. Each category-score record 410 includes a category 411 and a score 412. Each category 411 represents an entry in a ontology comprising a hierarchy of categories and corresponds to a category used in the characterisation information of the web page. The user profile 400 contains a record 410 for each category 411 for which the user is considered to have a preference or interest. The score 412 associated with the category 411 of each record 410 represents the strength of the user's preference for, or interest in, the category 411. The score 412 can, for example, be a value (e.g. 0.72) within a scalar range (e.g. 0-1) representing the strength of the user's preference for, or interest in, the category 411.

Figure 4B:
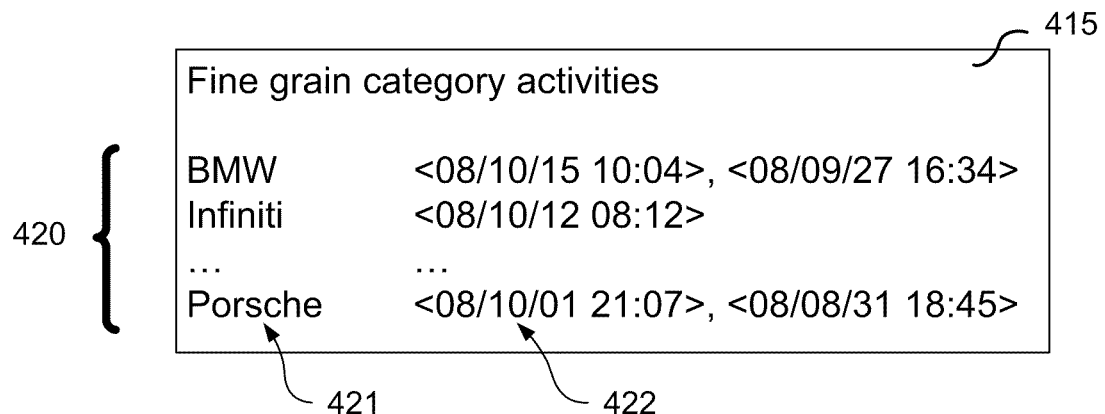
FIG. 4B is a schematic representation of a fine grain category activities.

FIG. 4B is a schematic representation of exemplary fine grain category activities 415. In addition to the category 411 and score 412 described above, the user profile may also comprise, or be associated with, fine grain category activity information. The fine grain category activities 415 comprise a plurality of text-timestamp records 420 that are associated with each user through the user profile. Each text-timestamp record 420 includes a text string 421 and one or more timestamps 422. The text string 421 in each text-timestamp record 420 corresponds to a text string in the classification information 200 of a web page received from the event processor 220. A timestamp 422 associated with the text string 421 in the text-timestamp record 420 represents the time when the classification information 200 containing the text string 421 was received. When multiple instances of classification information 200 for web pages containing the same text string 421 have been received, each timestamp 422 corresponds to the receipt of a different instance of classification information 200. The significance of the text-timestamp records 420 decays over time. When a timestamp 422 is older than a pre-determined threshold, it is removed from the text-timestamp record 420. When the most recent timestamp 422 in a text-timestamp record 420 is older than the pre-determined threshold, the text-timestamp record 420 is removed from the fine grain category activities 415.

As described above, the profiling engine 250 may adjust a user's profile based on the characterisation information associated with a web page. Additionally the profiling engine 250 can use the text-timestamp records 420 associated with a user as input when determining an update to the user's profile 400. The text-timestamp records 420 can provide a history of the user's interest and so help determine possible patterns in the history and so better characterize the user.

The profiling engine 250 may use the characterisation information of the event, the user's profile, including the fine grain category activity and the profiling rules generated by the modelling system 110 in order to modify the user's profile based on the current events, and past, events represented in the fine grain category activity information.

Referring again to FIG. 2, when the profiling engine 250 has completed creating or amending a user profile 400, the profile 400 is stored in the profile database 270. The profile database 270 can provide the contents of one or more user profiles 400 to an external system 190 such as, for example, an advertising server that uses the user profile 400 in the targeting (i.e. selecting based on the user's preferences) of advertisements to be presented to the user.

The clickstream collection unit 230 receives the event from the event processor, removes the user identifier and then sends the event to the modeling data aggregator 240.

The modeling data aggregator 240 aggregates one or more events received over time from the clickstream collection unit 230. The events can be aggregated for a pre-determined time period (e.g. a day, a week, thirty days, etc) before being sent to the modeling system 110 for analysis. Further, the modeling data aggregator 240 can select a sample set of the events received (as opposed to all of the events) to be sent to the modeling platform 280 of modelling system 110.

FIG. 5A is flow diagram representing illustrative steps in a method 500 for machine-learning based profiling. The method 500 can, for example, be implemented using the profiling system 100 described above with reference to FIG. 2. A user event that represents an action or activity by a user such as, for example, a web page view is received, at 510, by the profiling system 100. The event includes an event identifying information (e.g. the URL of the viewed web page) and user identification information. Receiving of the user event identification information can include removal of PII while still allowing the event to be associated with a specific user by a user identification information. In addition filtering (i.e. removing) events associated with sensitive web pages or content can be performed. The event identifying information (e.g. the URL) is used to look up a map (e.g. a cached web map) for a match at 512. A determination is made at 514 as to whether a match for the event identifying information (e.g. URL) was found in the map. When a match is found, YES at 514, classification information 300 associated with the event identification information (e.g. the URL and associated web page) is retrieved from the map at 516. The classification information 300 together with the user identification information is provided to a profiling function (e.g. the profiling engine 250). It is then determined if a user profile is already associated with the user identification information at 518. If a profile already exists, YES at 518, the user profile 300 is retrieved 520 from a repository (e.g. the profile database 270). If the user profile does not exist, NO at 518, an initial profile is created at 528. The profiling engine 250 can then generate profile update information at 522 using the user profile information, whether from the retrieved profile or the newly created, and so empty profile, and rules provided by the modelling system 110. The profiling rules define known associations as determined by the modelling system, the profiling rules define associations between user action events and user or customer behaviour. The user action events may include events such as the viewing of web pages or requesting of multimedia content and may be aggregated and sent to the modeling system periodically. The user profile is then updated at 524 and stored for access at 526 by an external system 190 (or forwarded to) such as, for example, an advertising server.

Referring again to when it is determined if the URL is in the web map at 514, if a match for the event identification information is not found in the map, NO at 514, the event identifying information (e.g. the URL) is sent 530 to the modeling system 110 to, for example, be provided to the web map crawler 282. When the modeling system 110 has visited the URL it can then provide classification information associated with the event identification information (e.g. URL) to update the cached web map module 260 at 532.

Figure 5B:
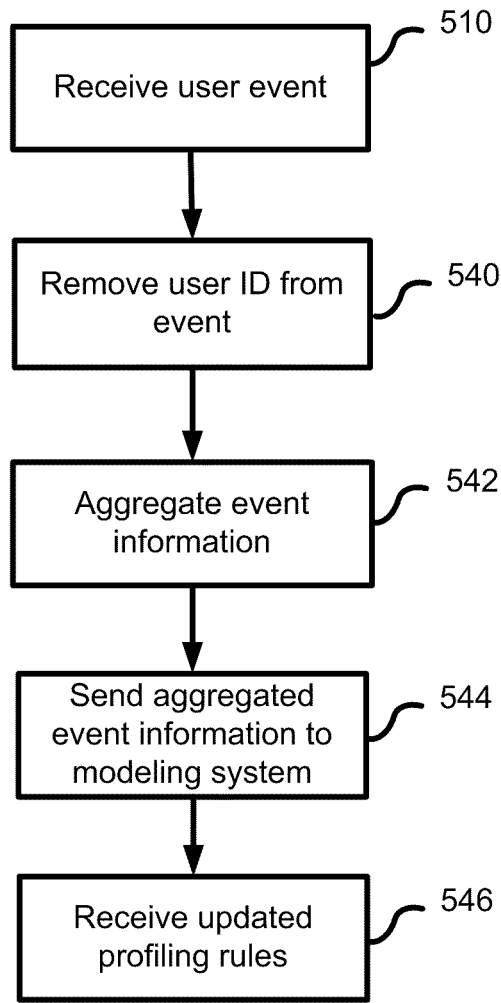

As shown in FIG. 5B, the profiling system 100 also collects the user events received at 510. The event identification information is collected and the user identifier is removed 540 from the user event by clickstream collection unit 230. Event identification for multiple events are aggregated at 542 by modelling data aggregator 240 which identify the user action events that have been collected. The user action events can be aggregated for a pre-determined time period (e.g. thirty days) and a sample set of the events (as opposed to all of the events) can be selected from the events collected. The aggregated event identification information is sent to a modeling system 110 at 544 and updated profiling models and rules are received at 546 for use by the profiling engine 250.

The updated profiling models and rules received at the profiling engine are used by the profiling engine when generating the profile update information. The rules allow the profiling engine to identify patterns or trends in the information the user shows an interest in and update the user profile information accordingly.

The method 500 according to the present disclosure can be implemented by a computer program product comprising computer executable instructions stored on a computer-readable storage medium such as read only memory, random access memory, hard drive or solid state storage, optical storage, or flash memory for execution by a processor of a computing device.

It will be apparent to one skilled in the art that numerous modifications and departures from the specific embodiments described herein may be made without departing from the spirit and scope of the present disclosure.

What is claimed is:

1. A computer implemented method of profiling a user of a computing device connected to a network, the method comprising:

receiving a user event comprising a content identifier for indicating web content requested by the user and a user identifier;

when the content identifier is not present in a cached web map, sending the content identifier to a modeling system which performs a mapping function of a location associated with the content identifier and determines classification information of the content identifier, wherein the classification information is added to the cached web map;

accessing the classification information from the cached web map, stored remotely from the user, using the content identifier of the user event, the cached web map associating a plurality of content identifiers each with respective classification information, the classification information associating a score with a text string defined in a lexical ontology comprising a hierarchy of categories, the score representing a strength of association of the respective text string to web content associated with the respective content identifier;

accessing a user profile associated with the user identifier of the user event, the user profile associating one or more scores with one or more respective categories from the hierarchy of categories, each score of the user profile providing an indication of user preference for an associated category; and updating scores of the user profile based on the classification information associated with the content identifier by applying profiling rules generated from a plurality of user events of one or more users, the profiling rules being provided by the modeling system for modeling user behavior from the plurality of user events to predict user preferences, wherein the profiling rules are generated by:

aggregating the plurality of user events;

periodically modeling user behavior based on the aggregated plurality of user events independently of user identifiers of the aggregated plurality of user events; and receiving updated profiling rules in response to the modeled aggregated plurality of user events, the updated profiling rules used for updating scores of user profiles.

2. The computer implemented method of claim 1 further comprising creating a new user profile if a profile associated with the user identifier is not present in a profile database.

3. The computer implemented method of claim 2 wherein the score is a value within a scalar range with a decimal value between 0 and 1.

4. The computer implemented method of claim 3 wherein the value of each score of respective one or more categories is decreased by a defined amount on a periodic basis in order to provide a time decay function.

5. The computer implemented method of claim 1 wherein the content identifier is a universal resource locator (URL).

6. The computer implemented method of claim 1 wherein each user profile further comprises fine grain category activities for each category identified in the user profile, each fine grain category activity entry associating one or more timestamps with one or more text strings corresponding to classification information, the one or more timestamps representing a time when the classification information containing the text string was received.

7. The computer implemented method of claim 6 wherein when multiple instances of classification information containing the same text string have been received, each timestamp corresponds to receipt of a different instance of classification information, and wherein the profiling rules decay a significance of the text-timestamped classification information records over time.

8. The computer implemented method of claim 7 wherein a timestamp older than a predetermined threshold is removed.

9. A system for profiling a user of a computing device, the system comprising:

at least one processor for executing instructions; and memory for storing instructions that when executed by the at least one processor configure the system to provide:

an event receiver module for receiving a user event comprising a content identifier indicating web content requested by the user and a user identifier;

a web map module for storing a cached web map associating a plurality of content identifiers each with respective classification information is stored remotely from the user, the classification information associating a score with a text string defined in a lexical ontology comprising a hierarchy of categories, the score representing a strength of association of the respective text string to web content associated with the respective content identifier, wherein when the content identifier is not present in the cached web map, the content identifier is sent to a modeling system which performs a mapping function of the location associated with the content identifier and determines classification information of the content identifier, the classification information being added to the cached web map;

an event processor module for processing the received user event to determine classification information from the web map based upon event identification information; and a profiling engine module for retrieving a user profile associated with the user identifier of the user event, the user profile associating one or more scores with one or more respective categories from the hierarchy of categories, each score of the user profile providing an indication of user preference for the associated category and for updating scores of the user profile based on the classification information associated with the content identifier by applying profiling rules generated from a plurality of user events of one or more users, the profiling rules being provided by the modeling system for modeling user behavior from the plurality of user events to predict user preferences, wherein the instructions when executed by the at least one processor further configuring the system to provide:

a modeling data aggregator for aggregating the plurality of user events;

wherein the modeling system periodically models user behavior based on the aggregated plurality of user events independently of user identifiers of the aggregated plurality of user events; and wherein the profiling engine module receives updated profiling rules in response to the modeled aggregated plurality of user events, the updated profiling rules used for updating scores of user profiles.

10. The system of claim 9 wherein a value of the score is a scalar value with a decimal value between 0 and 1.

11. The system of claim 10 wherein the value of each score of a respective one or more categories is decreased by a defined amount on a periodic basis in order to provide a time decay function.

12. The system of claim 9 wherein the content identifier is a universal resource locator (URL).

13. The system of claim 9 wherein each user profile further comprises fine grain category activities for each category identified in the user profile, each fine grain category activity entry associating one or more timestamps with one or more text strings corresponding to classification information, the one or more timestamps representing a time when the classification information containing the text string was received.

14. The system of claim 13 wherein when multiple instances of classification information containing the same text string have been received, each timestamp corresponds to receipt of a different instance of classification information, and wherein profiling rules decay a significance of the text-timestamped classification information records over time.

15. The system of claim 14 wherein a timestamp older than a predetermined threshold is removed.

16. A computer-readable storage medium containing instructions for execution on a processor for performing a method of profiling a user of a computing device connected to a network the instructions for performing:
- receiving a user event comprising a content identifier for indicating web content requested by the user and a user identifier;
- when the content identifier is not present in a cached web map, sending the content identifier to a modeling system which performs a mapping function of a location associated with the content identifier and determines classification information of the content identifier, wherein the classification information is added to the cached web map;
- accessing the classification information from the cached web map, stored remotely from the user, using the content identifier of the user event, the cached web map associating a plurality of content identifiers each with respective classification information, the classification information associating a score with a text string defined in a lexical ontology comprising a hierarchy of categories, the score representing a strength of association of the respective text string to web content associated with the respective content identifier;
- accessing a user profile associated with the user identifier of the user event, the user profile associating one or more scores with one or more respective categories from the hierarchy of categories, each score of the user profile providing an indication of user preference for the associated category; and updating scores of the user profile based on the classification information associated with the content identifier by applying profiling rules generated from a plurality of user events of one or more users, the profiling rules being provided by the modeling system for modeling user behavior from the plurality of user events to predict user preferences, wherein the profiling rules are generated by:
- aggregating the plurality of user events;
- periodically modeling user behavior based on the aggregated plurality of user events independently of user identifiers of the aggregated plurality of user events; and
- receiving updated profiling rules in response to the modeled aggregated plurality of user events, the updated profiling rules used for updating scores of user profiles.

* * * * *